Dec. 12, 1950 — A. S. BRUNJES — 2,533,992
AMMONIA RECOVERY UNIT
Filed Sept. 26, 1947
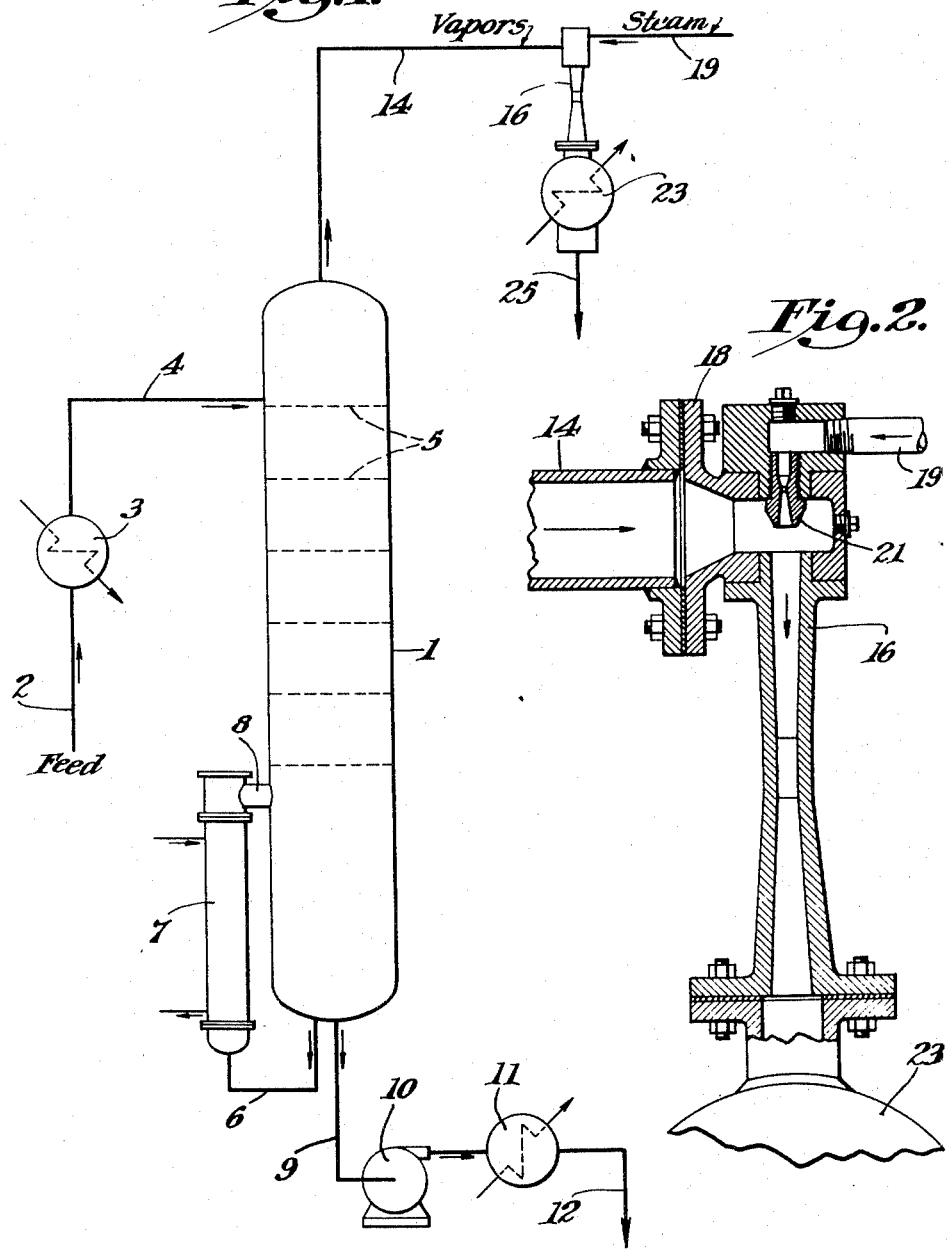
INVENTOR.
Austin S. Brunjes
BY Nathaniel Ely
ATTORNEY Patented Dec. 12, 1950

2,533,992

UNITED STATES PATENT OFFICE 2,533,992

AMMONIA RECOVERY UNIT

Austin S. Brunjes, Plandome, N. Y., assignor to The Lummus Company, New York, N. Y., a corporation of Delaware Application September 26, 1947, Serial No. 776,377

2 Claims. (Cl. 202—52)

1

This invention relates to distillation and more particularly to the recovery of ammonia from ammoniacal solutions of heat sensitive materials.

Such materials as the hormones, terpenes and vitamins are commonly known as heat sensitive materials because of their tendency to decompose at relatively low temperatures. In distilling solutions of these materials the temperature of the solution must be kept as low as possible, and therefore, it is the practice to distill such materials at pressures less than atmospheric. When, as in many processes involving their purification, it is necessary to separate ammonia from these solutions, the operation is complicated by these low pressures. From a study of the vapor-liquid characteristics of ammonia solutions at sub-atmospheric pressures it is apparent that ammonia will separate from its solution as concentrated ammonia vapors only. That is, the vapors in equilibrium with the solution at low temperatures and pressures contain a high concentration of ammonia and, therefore, less concentrated vapors cannot first be separated overhead by distillation. The only recourse is to strip the solution of ammonia until the allowable limit of ammonia is reached and then treat the concentrated vapors separately. Further study shows that such vapors can be condensed only by refrigeration at these distillation pressures—a step that is quite uneconomical considering the relatively low value of the recovered ammonia. Alternatively, however, they may be absorbed directly in water whereby a dilute ammonia solution is recovered. This is the customary way of operating the system since it is usually desired to reuse the ammonia as solvent for more of the heat sensitive material. This method has the disadvantage, of course, of requiring an absorption unit with all of its auxiliary equipment and the absorber represents a large part of the initial investment in such a system.

To eliminate the need for either the absorption unit or the refrigeration system, I have provided a method whereby a dilute solution of the heat sensitive material may be recovered directly from the distillation unit. In accordance with my method the solution of heat sensitive material is first distilled under a vacuum to separate concentrated ammonia vapors overhead from the desired heat sensitive product as bottoms using a steam ejector to produce the desired vacuum. The overhead ammonia vapors are then entrained in the steam passing through the ejector and the resulting ammonia-steam mixture is thereafter condensed in a surface condenser whereby an ammonia solution of the desired strength may be withdrawn to be reused as solvent for more of the heat sensitive material.

It is the principal object of my invention to separate ammonia from ammoniacal solutions of heat sensitive materials in a single column without using a separate absorption unit and without requiring refrigeration.

It is a further object of my invention to recover a dilute solution of ammonia from an ammoniacal solution of a heat sensitive material by separating and thereafter entraining the ammonia vapors in steam to recover a solution of the desired concentration using no other apparatus than that associated with a vacuum distillation unit.

Further objects and advantages of my invention will appear from the following description thereof taken in conjunction with the accompanying drawing in which, Figure 1 is a schematic drawing of a distillation system suitable for carrying out my invention, Figure 2 is a detailed cross-sectional view of the steam ejector shown on the overhead line of Figure 1.

Referring now to Figure 1, a dilute ammoniacal solution is introduced as feed to the column 1 through line 2, preheater 3 and line 4. In the preheater 3 the feed is raised to about the boiling point and then passed preferably to the top plate of column 1 so that in effect all of the plates 5 will act as stripping plates. Since the vapors in equilibrium with the feed are more concentrated than desired in the overhead product, the only function of the column 1 is to strip ammonia from the entering solution until the bottoms in the column is of the desired concentration with respect to its ammonia content. Any plates above the feed would merely serve to concentrate the vapors further which is the opposite of what is desired in this case and, therefore, these plates are not necessary.

The liquid component of the feed introduced onto the top plate of column 1 falls through the bubble trays 5 to the bottom of the tower where a part may be withdrawn through line 6 and passed to the reboiler 7. This part is heated and partially vaporized and thereafter returned to the column through line 8. The vaporous component of the mixture rises through the plates to strip the desending liquid of most of its ammonia content and the stripped liquid may be withdrawn by pump 10 and line 9. This bottoms product is cooled in the product cooler 11 from which it is withdrawn through line 12 as product.

The vapors rising in the column 1 are passed from the top of the column 1 through line 14 to the vacuum unit 16. Steam in an amount greater than that required to maintain the desired vacuum on the column is introduced to the jet injector 16 through line 19. As indicated in Figure 2 the ejector is connected by coupling 18 to line 14 so that the overhead vapors are entrained by the steam leaving the nozzle 21. The steam and vapors are mixed so that the concentration of ammonia in the vapors is such that the vapor-steam mixture may be readily condensed at the temperature of the available cooling water in the surface condenser 23.

It is to be noted that in the usual vacuum distillation unit the ejector is so mounted that the overhead vapors from the still are first passed through a surface condenser where the vapors are condensed and the non-condensable gases thereafter withdrawn through the ejector. The steam passing through the ejector is, in that case, condensed in a condenser operated independently of the vapor condenser. Thus the ejector is used only to maintain the vacuum by removing the non-condensable gases. Since, as set forth above, it is impossible to condense concentrated ammonia vapors in the same way without the aid of refrigeration they are, in accordance with my invention, passed directly to the ejector and mixed with an excess of steam to produce a mixture readily condensable at the temperature of the available cooling water thereby eliminating the need for an expensive refrigeration system or auxiliary absorption system. The resultant mixture is then condensed in the surface condenser 23 and an overhead product of the desired concentration may be withdrawn through line 25.

It will be apparent that the concentration of ammonia in the overhead product may be adjusted by changing the steam rate in the line 19. At all times, however, there must be sufficient steam to form a condensable mixture.

As a specific example, an 11% ammonia solution of a heat sensitive material such as one of the vitamins was fed to column 1 and it was desired to recover an overhead containing 25% ammonia and a bottoms product containing 4% ammonia. For purposes of illustration, the concentration of the vitamin in the solution may be neglected as in the usual commercial recovery process this would be a valid approximation since at the stage of recovery with which this discussion is concerned the vitamin concentration is usually less than 1%. In other words, the composition of the solution in the example chosen is 11% ammonia, over 88% water and less than 1% vitamin, and the solution may be treated as a binary of ammonia and water.

The maximum temperature to which this binary may be heated is limited to the decomposition temperature of the heat sensitive material which in this particular case is about 158° F. This maximum temperature is fixed at the bottom of the tower 1 and to boil the solution at this temperature a pressure of about 4 pounds absolute is required at the top of the tower. From a consideration of the characteristics of ammonia solutions at this temperature and pressure it will be apparent that the vapors in equilibrium with this solution will have an ammonia concentration of about 80%. Since the dew-point of an 80% ammonia solution is about −60° F. a temperature substantially less than this would be required to condense the vapors directly. However, by first mixing these vapors with sufficient steam the concentration of ammonia may be reduced to a point where the vapors may be easily condensed with available cooling water. In other words, the dew-point of the vapors will be raised sufficiently so that they may be easily and economically handled at the tower pressure of 4 pounds absolute.

Assuming 22,500 pounds per hour of feed entering the column then of this amount 2070 pounds of 80% ammonia vapors per hour (1658 pounds per hour of ammonia and 412 pounds per hour of water) will pass overhead under the operating conditions set forth above. To produce an ammonia-steam mixture that may be condensed to give a 25% ammonia solution overhead it will be necessary to supply steam at the rate of 4,560 pounds per hour and this is more than sufficient to maintain the desired vacuum. The steam enters the ejector at 150 pounds per square inch absolute and is discharged to the condenser at about 15 pounds per square inch absolute. Since the 25% ammonia-steam mixture has a dew point of about 197° F. it is easily condensed with available cooling water and the desired overhead product of a 25% ammonia solution is directly withdrawn through line 25. If other concentrations are desired, the jet may be adjusted to supply directly the necessary steam and thus simultaneously establish the appropriate vacuum.

While I have shown and described a preferred form of embodiment of my invention I am aware that modifications may be made thereto and I, therefore, desire a broad interpretation of the invention within the scope and spirit of the description herein and of the spirit of the claims hereinafter appended.

I claim:

1. A method of purifying a heat sensitive material in a relatively dilute aqueous ammonia solution which comprises distilling said solution under sub-atmospheric conditions developed by a steam jet such that a relatively concentrated aqueous ammonia solution free of the heat sensitive material and containing about 80% ammonia is removed overhead and a relatively concentrated heat sensitive material in ammonia solution is removed as bottoms product, directly injecting vacuum producing steam into said concentrated aqueous ammonia overhead in excess of that required to produce the desired vacuum to reduce the ammonia concentration to about 25% with a dew point above that of cooling water and condensing said reduced concentration overhead by indirect heat exchange with cooling water.

2. A method of purifying a heat sensitive material as claimed in claim 1 in which the concentration of ammonia in the bottoms is about 4% ammonia.

AUSTIN S. BRUNJES.

REFERENCES CITED

The following references are of record in the file of this patent:

UNITED STATES PATENTS

| Number | Name | Date |
|---|---|---|
| 144,358 | Root | Nov. 4, 1873 |
| 1,360,785 | Parrish | Nov. 20, 1920 |
| 1,882,552 | Gensecke | Oct. 11, 1932 |
| 2,451,332 | Green | Oct. 12, 1948 |

OTHER REFERENCES

Othmer, "Partial Pressure Processes," Ind. and Eng. Chem., Sept. 1941, vol. 33, No. 9, pp. 1106–1112.